United States Patent
Peot et al.

(10) Patent No.: US 7,523,078 B2
(45) Date of Patent: Apr. 21, 2009

(54) BAYESIAN APPROACH FOR SENSOR SUPER-RESOLUTION

(75) Inventors: Mark Alan Peot, Irmo, SC (US); Mario Aguilar, Cary, NC (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 380 days.

(21) Appl. No.: 11/239,981

(22) Filed: Sep. 30, 2005

(65) Prior Publication Data

US 2007/0130095 A1 Jun. 7, 2007

(51) Int. Cl.
*G06F 15/18* (2006.01)
(52) U.S. Cl. .................................. 706/12; 382/299
(58) Field of Classification Search .............. 706/12
See application file for complete search history.

(56) References Cited

U.S. PATENT DOCUMENTS

2004/0170340 A1   9/2004   Tipping et al.

OTHER PUBLICATIONS

Michael Tipping, Christopher Bishop "Bayesian Image Super-resoultion" NIPS 2002.*
B.D. Lucas and T. Kanade, "An Iterative Image Registration Technique with an Application to Stereo Vision," Proceedings of the 1981 DARPA Image Understanding Workshop, Apr. 1981, pp. 121-130.
B.D. Lucas and T. Kanade, "An Iterative Image Registration Technique with an Application to Stereo Vision," Proceedings of the 7th International Joint Conference on Artificial Intelligence (IJCAI '81), Apr. 1981, pp. 674-679.
S. Baker and I. Matthews, Lucas-Kanade 20 Years On: A Unifying Framework: Part 1, tech. report CMU-RI-TR-02-16, Robotics Institute, Carnegie Mellon University, Jul. 2002.
S. Baker, R. Gross, I. Matthews, and T. Ishikawa, Lucas-Kanade 20 Years On: A Unifying Framework: Part 2, tech. report CMU-RI-TR-03-01, Robotics Institute, Carnegie Mellon University, Feb. 2003.
S. Baker, R. Gross, and I. Matthews, Lucas-Kanade 20 Years On: A Unifying Framework: Part 3, tech. report CMU-RI-TR-03-35, Robotics Institute, Carnegie Mellon University, Nov. 2003.
Tipping, Michael E., Bishop, Christopher M. "Bayesian Image Super-Resolution," NIPS 2002, pp. 1279-1286.

* cited by examiner

*Primary Examiner*—David R Vincent
*Assistant Examiner*—Lut Wong
(74) *Attorney, Agent, or Firm*—Eugene S. Indyk

(57) ABSTRACT

Bayesian super-resolution techniques fuse multiple low resolution images (possibly from multiple bands) to infer a higher resolution image. The super-resolution and fusion concepts are portable to a wide variety of sensors and environmental models. The procedure is model-based inference of super-resolved information. In this approach, both the point spread function of the sub-sampling process and the multi-frame registration parameters are optimized simultaneously in order to infer an optimal estimate of the super-resolved imagery. The procedure involves a significant number of improvements, among them, more accurate likelihood estimates and a more accurate, efficient, and stable optimization procedure.

1 Claim, 10 Drawing Sheets $W_i$ captures the focus, psf, and image spatial transformation processes.

BAYESIAN APPROACH FOR SENSOR SUPER-RESOLUTION

TECHNICAL FIELD

This disclosure describes a method for combining multiple low-resolution images or signals into a single high-resolution image or signal. More particularly, this disclosure relates to a Bayesian technique for forming a high-resolution image or signal from a plurality of low-resolution images or signals.

BACKGROUND

There are a number of prior techniques for deriving a high-resolution image from a plurality of low-resolution images.

In one technique, each low resolution image is aligned to a reference image using an alignment algorithm such as Lucas-Kanade [1-5]. The aligned images are then combined using stacking (robust sum), Bayesian inference, or learned statistics. There are two primary problems with this approach. (1) It attempts to achieve sub-pixel alignment accuracy in aligning the low-resolution images using only the low-resolution image. (2) This approach is not model-based, so it cannot accommodate barrel/pincushion distortion, diffraction or other effects.

In another technique, both the super-resolved image and the alignment parameters are constructed through optimization of the likelihood of the measured data (y) given the alignment parameters (A) and hypothesized super-resolved image (x) That is, the algorithm maximizes P(y|A, x). Some of these algorithms can optionally use a prior on the alignment parameters or the hypothesis (maximizing either P(y, x|A) or P(y, x, A). However is difficult (and frequently unstable) to simultaneously align and resolve the images.

An advantage of the model based approaches (optimization, Tipping-Bishop [6] and our own) is that the formulation is very general. For example, the set of "alignment parameters" (A) may capture any number of transformation parameters for example, degree of pin-cushion distortion, degree of barrel distortion, shift, rotation, degree of blurring kernels including Gaussian or other diffraction kernels.

US Patent Application Publication US2004/0170340 A1 of Tipping and Bishop refers to a Bayesian technique for computing a high resolution image from multiple low resolution images. The algorithm in the Tipping-Bishop application marginalizes the super-resolved image out of P(y, x|A) allowing one to directly optimize the likelihood for the alignment parameters followed by a super-resolution step. That is, the algorithm allows direct computation of P(y|A), allowing an optimization algorithm to directly optimize the alignment parameters. In the Tipping-Bishop application, these alignment parameters included shift, rotation and width of the point spread function (A=<s, θ, γ>) for the optical system (degree of blur). The problem with the approach of the Tipping-Bishop application is that it is mathematically incorrect. In the derivation of the approach they made a major algebra or formulation mistake with the result that the resulting alignment likelihood P(y|A) is incorrect. In practice, the algorithm frequently diverges when optimizing some imaging parameters, particularly the point spread function.

SUMMARY

We have derived a corrected likelihood function that is more accurate, has a significantly simpler functional form and works extremely well, displaying none of the instability exhibited by the Tipping-Bishop approach. Multiple low-resolution images or signals are accurately aligned to sub-pixel resolution and stacked to form a single high-resolution image or signal. For example, ten-low resolution images are used to form a single high-resolution image with 4× to 9× resolution, that is, 4 to 9 times the pixels or 2 to 3 times the linear resolution of the low resolution images.

DETAILED DESCRIPTION

Figure 1:
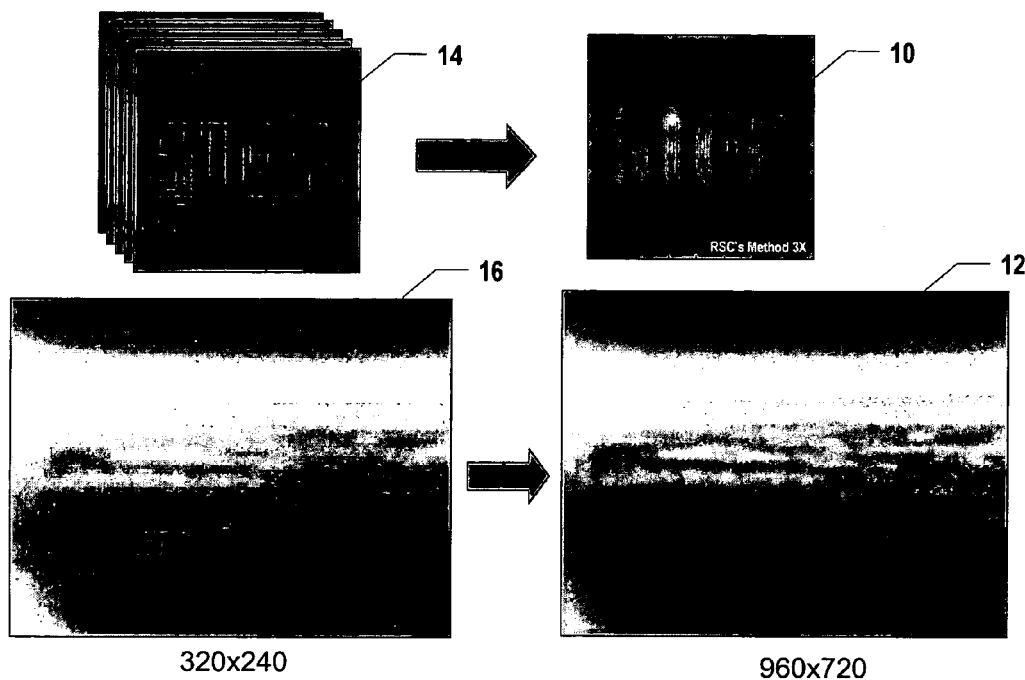
FIG. 1 shows examples of high resolution images derived from low resolution images using the disclosed invention.

FIG. 1 illustrates examples of two high-resolution images 10 and 12 that have been derived from respective pluralities of low-resolution images 14 and 16. As is shown in FIG. 1, use of the invention of this application significantly increases the clarity and sharpness of the low resolution images 10 and 12.

Figure 2:
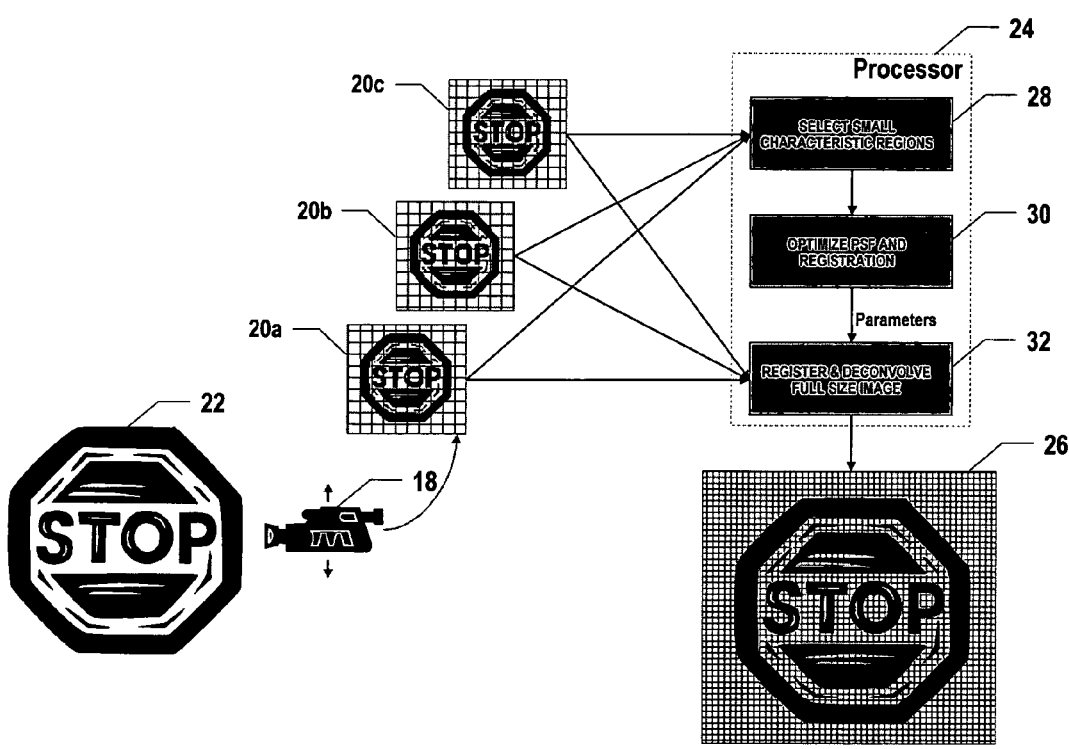
FIG. 2 shows one example of the invention of this application.

FIG. 2 illustrates the general principles involved in transforming the low resolution images 14 and 16 into high resolution images 10 and 12 in FIG. 1. In particular, the apparatus of FIG. 2 combines multiple 'low-resolution' samples of a scene in order to reconstruct a 'high-resolution' estimate. Multiple low-resolution images are combined to infer the parameters that optimally counter the sub-sampling and between-image geometric transformations.

The approach is statistical in that the high-resolution image is obtained through an inference procedure. Inference is based on exploiting the knowledge derived from the low-resolution imagery and the models of the subsampling process (i.e. point-spread-function) and registration of the imagery. We present the details of the procedure and a correct derivation in the next section. The optimization is performed in one or more subsets or portions of the low resolution imagery due to the significant computational requirements of the procedure.

FIG. 2 shows a camera 18 that creates a plurality of low resolution images 20a, 20b, and 20c of a scene 22. The low resolution images 20a, 20b, and 20c from an imaging sensor in the camera 18 are sent to a processor 24 located in the camera 18 or outside the camera 18. The processor 24 generates a high resolution image 26 from the low resolution images 20a, 20b, and 20c produced by the camera 18. The functionality of the processor 24 may be implemented in any form of hardware or software. It may for example be implemented in a personal computer or a special purpose digital signal processor.

The processor 24 contains a block 28 which is responsive to the low resolution images 20a, 20b, and 20c to select one or more small characteristic regions or portions of the low resolution images 20a, 20b, and 20c for processing in accordance with this example of the invention. These selected regions constitute areas containing a great deal of detail or high frequency content in the low resolution images 20a, 20b, and 20c. Once these regions have been identified and selected, block 30 in the processor 24 optimizes both the point spread function and registration parameters for the selected regions. Block 32 then registers and deconvolves the full size image using the parameters from block 30 and generates the high resolution image 26.

Figure 3:
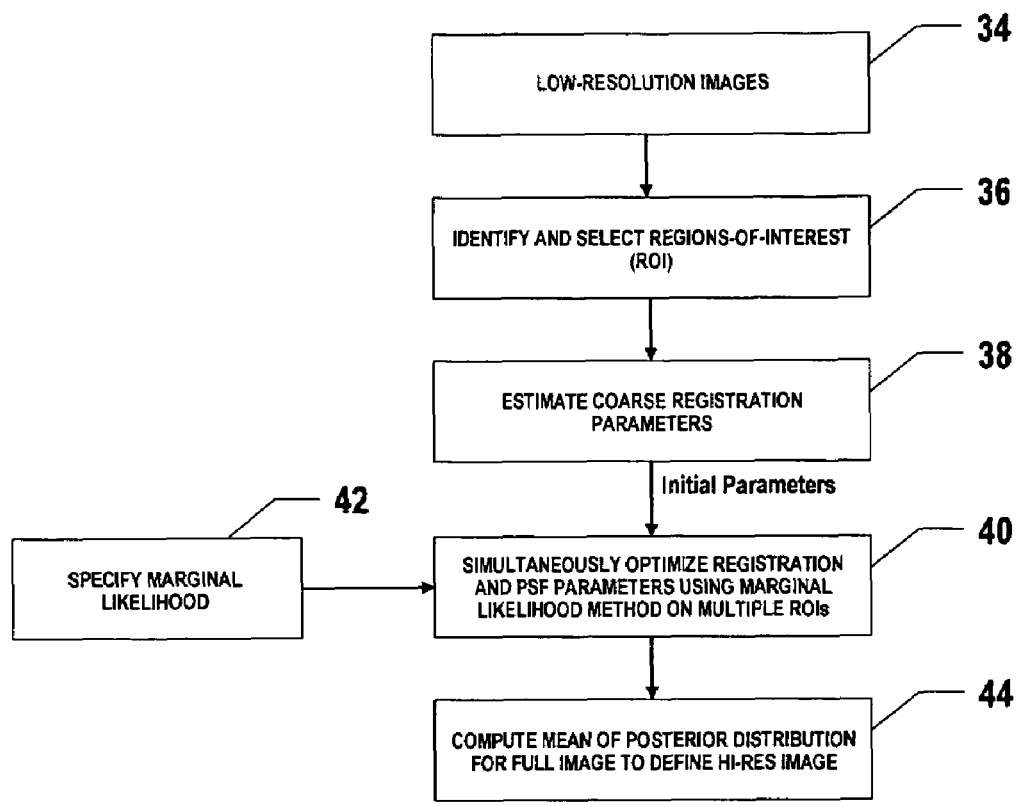
FIG. 3 shows details of the processor shown in FIG. 2.

FIG. 3 shows more details of the operation of the processor 24 in FIG. 2. Low resolution images 20a, 20b, and 20c from the camera 18 are input to the processor 24 in block 34. Block 36 in FIG. 3 selects one or more regions of interest in the low resolution images. These regions of interest are small subsets or portions of the low resolution images that are selected for the optimization process described in detail below. They may include the center region of the low resolution images and any other region or regions in the low-resolution images spaced from the centers of the images that exhibit a large amount of image information such as regions of great detail or high frequency content. Preferably, the regions of interest are a number of high information content regions spaced away from the centers of the low-resolution images. In one embodiment, we used a technique developed by Lucas and Kanade for identifying information rich areas via eigenvalue analysis. In any case, if the alignment regions are widely separated, we can compute the alignment likelihood for the parameters in that region independent of the alignment likelihoods for other regions, resulting in a significant computational savings.

After the regions of interest have been identified in block 36, block 38 estimates coarse registration parameters which in this application of the method can include translational and rotational orientation of the low resolution images with respect to a predetermined frame of reference. These translations and rotations are produced by slight motion of the camera 18 occurring in the time between capture of each successive low resolution image 20a, 20b, and 20c by the camera 18.

The registration parameters and the point spread function (PSF) parameters are optimized in block 40 using a marginal likelihood function specified by block 42. The details of the marginal likelihood function are described below. Block 40 produces a best estimate of the registration and PSF parameters for the selected regions of interest. These parameters are then used in block 44 to compute the mean of the posterior distribution for the full image which thereby defines the high resolution image.

To implement the Bayesian super-resolution approach in accordance with this invention, we must fuse K 'low-resolution' images each containing M-pixels in order to assemble a single super-resolved image with N pixels where N>M. Here, M is the product of the height and width of the k low-resolution image in pixels. N is the product of the height and width of the super resolved image. This patent application describes the alignment and super-resolution of rectangular images. In fact, the algorithm may be used for signals of arbitrary geometry, including 2D signals with non-rectangular sampling grids (such as a radar signal), 2D super-resolved images wrapped over a 3D surface, or recovery of a high-resolution 1D signal (such as audio) from multiple sources (microphones). Furthermore, notice that M can be constant across all samples (as when images are collected from a single camera) or different (i.e. $M^{(k)}$) as when images are collected from different cameras and fused using the proposed method.

We must derive a model of the generation of the images (i.e. low-res samples) in order to obtain an observation model. In particular, we know that the camera's optics and sampling process cause a simultaneous sub-sampling and blurring of the scene. Hence, the observation model can be captured as:

$$y^{(k)} = W^{(k)}x + \epsilon$$

$$\epsilon_j = N(0, \beta^{-1})$$

Figure 4:
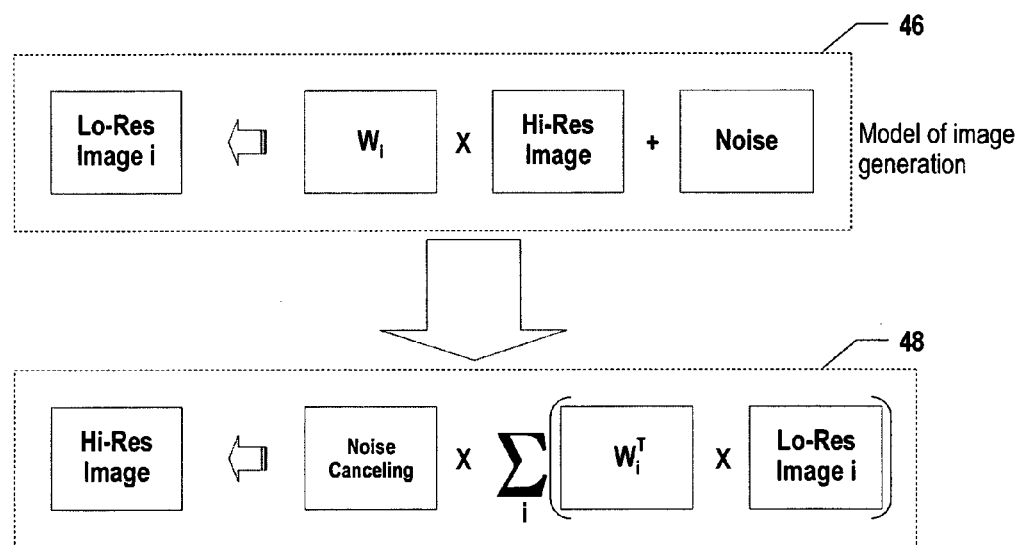
FIG. 4 shows the relationship between the low resolution images and the high resolution image derived in accordance with the invention.

Here, $y^{(k)}$ is the kth low-res image, x is the full-resolution scene, $W^{(k)}$ is a transform that captures the sub-sampling and blurring of the scene for the kth low-res image (i.e. sampling filter), and $\epsilon$ represents Gaussian noise in the process. Specifically, $W^{(k)}$ captures the focus, point spread function, and spatial transformation between the high resolution image and the kth low resolution image. This relationship between a low resolution image y and the high resolution image x is shown by the model of image generation 46 in FIG. 4.

As $W^{(k)}$ captures the map between the high-resolution image and each of the K low-resolution samples, its dimensions are M×N. Given a Gaussian model for the imaging process, the $W^{(k)}$ values must be normalized to the [0,1] range to conserve energy:

$$W_{ji}^{(k)} = \frac{w_{ji}^{(k)}}{\sum_{i'} w_{ji'}^{(k)}} \tag{A}$$

$$\text{where } w_{ji}^{(k)} = \exp\left\{-\frac{\|v_i - u_j^k\|^2}{\gamma^2}\right\}. \quad j \in [1, K, M] \; i \in [1, K, N] \tag{B}$$

Here, $u_j^k$ are the hypothesized centers for the sampling array, given the alignment parameters. The $v_i$ are the centers for the super-resolved image or signal. Both $v_i$, $u_j^k$ are expressed in the same global coordinate system. In this example, the point spread function is a Gaussian blur kernel $$\exp\left\{-\frac{\|v_i - u_j^k\|^2}{\gamma^2}\right\}$$

with a point spread variance of y. In practice, we can use any linear transformations, for example, we can use the Biot-Savart Law to determine a super-resolved image of a current sheet given magnetic field measurements.

$$u_j^{(k)} = R(\theta_k)(v_j - \overline{v}) + \overline{v} + s_k \tag{C}$$

$$\text{where } R(\theta_k) = \begin{pmatrix} \cos\theta_k & \sin\theta_k \\ -\sin\theta_k & \cos\theta_k \end{pmatrix} \tag{D}$$

and $s_k$ is the translation.

Each of the $v_i$ is the Cartesian coordinates in the super-resolved image space of the center of the grid cell i (i.e. the center of pixel i). Each $v_j$ is the Cartesian coordinates of the center of super-resolved grid cell j for each low-resolution image. Each $u_j^{(k)}$ is the location of each $v_j$ on the super-resolved image after rotation and shift. In practice, we can use other geometric transformations to determine $u_j^{(k)}$, including general affine transformations, perspective transformations, etc.

Finally, the prior is defined by a covariance matrix $Z_x$, which is N×N.

$$Z_X(i,j) = A\exp\left\{-\frac{\|v_i - v_j\|^2}{r^2}\right\}. \quad (E)$$

Given the shift $s_k$ and rotation $\theta_k$ for each image and the $\gamma$ for the PSF, we can compute the marginal likelihood:

$$lgP\{y^{(1)}\ldots y^{(k)}|A\} =$$
$$-\frac{1}{2}\left(KM\,lg(2\pi) + KM\,lg\beta + lg|Z| - lg|\Sigma| - \mu^T\Sigma^{-1}\mu + \beta\sum_k y^{(k)T}y^{(k)}\right)$$

$$\Sigma = \left[Z_x^{-1} + \beta\left(\sum_{k=1}^{K} W^{(k)T}W^{(k)}\right)\right]^{-1} \quad (1)$$

$$\mu = \beta\Sigma\left(\sum_{k=1}^{K} W^{(k)T}y^{(k)}\right) \quad (2)$$

$\mu$ is the mean of the super-resolved image pixels and $\Sigma$ is their covariance.

Let $P=\Sigma^{-1}$. In order to find the registration and deblurring parameters, we perform an optimization procedure a subset $f$ $(s_k,\theta_k,\gamma)$ of the marginal likelihood function (see appendix) to obtain:

$$f(s_k, \theta_k, \gamma) = -lg|P| + \mu^T P\mu \quad (3)$$

$$(s_k, \theta_k, \gamma) = \arg\max_{s_k,\theta_k,\gamma} f(s_k, \theta_k, \gamma) \quad (4)$$

The optimization only needs to be performed on one or more small regions of the image. For example, a 9×9 patch at the center of the image or spaced from the center of the image may be optimized. Once the optimization is performed, one can compute the full image $\mu$ using (1) and (2) above. Operation of the processor 24 in implementing Equation (2) to derive the high resolution image is illustrated by high resolution image computation block 48 in FIG. 4.

Figure 5A:
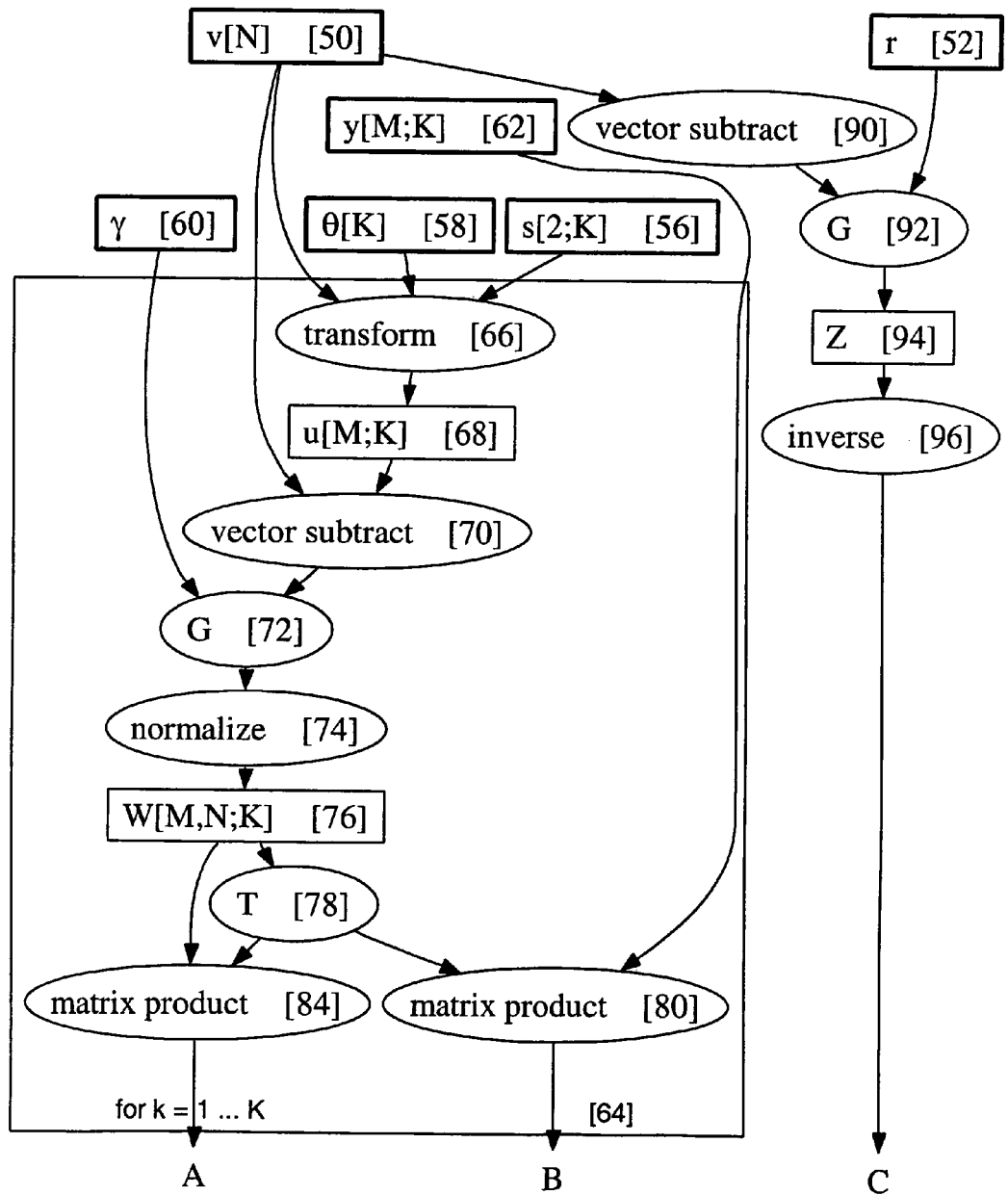
FIG. 5 is a flow chart illustrating the generation of a maximum likelihood function in accordance with the invention.
Figure 5B:
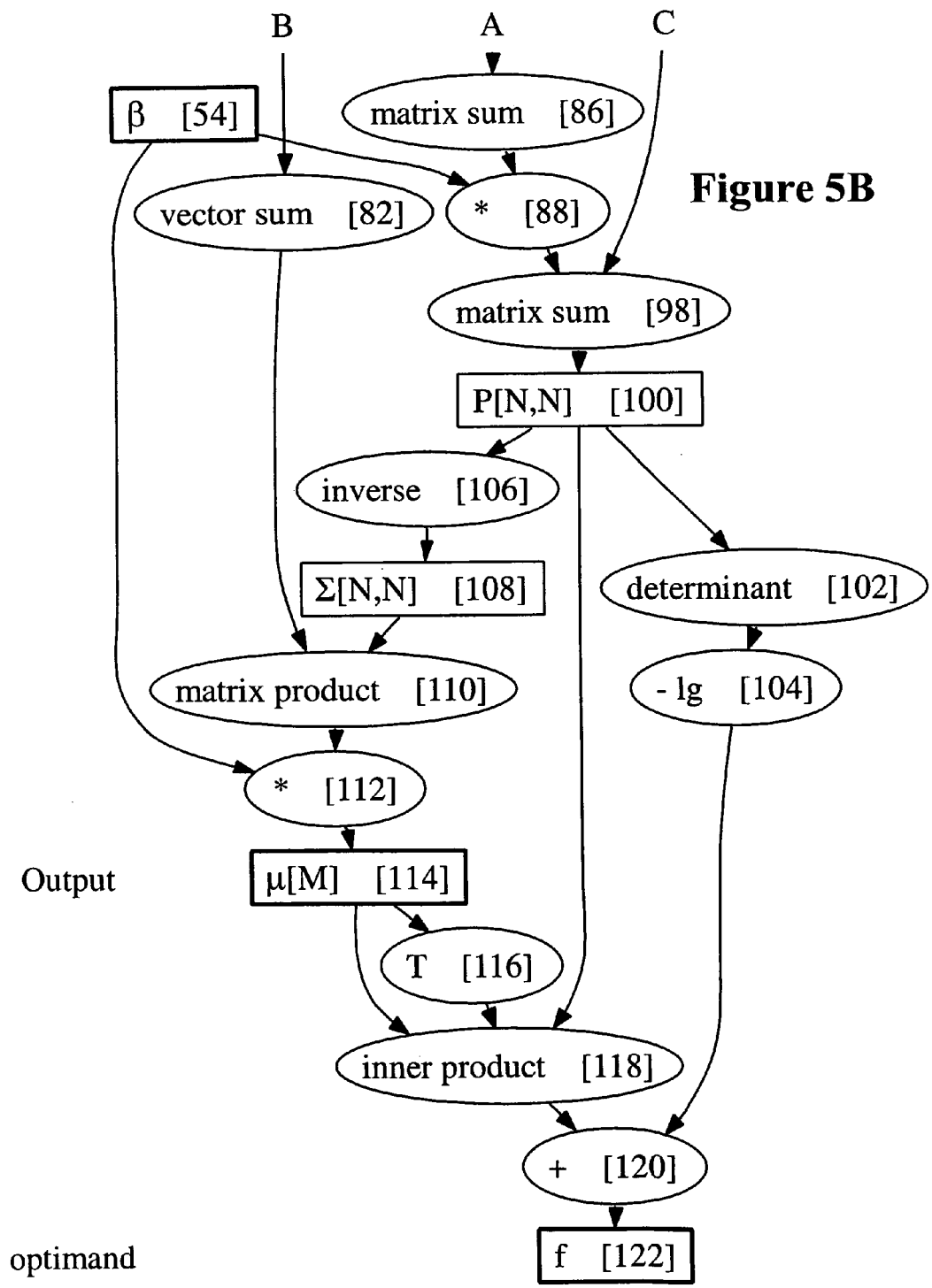

The processor 24 generates the improved marginal likelihood function $f$ of this invention as shown in FIGS. 5A and 5B. The function $f$ for selected regions of interest in the low resolution images is then optimized to ascertain the registration parameters that can be used to derive the entire high resolution image beyond the regions of interest.

The processor 24 includes registers or storage elements that hold system constants or inputs from previous stages that are used in the maximum likelihood calculation. Those storage elements include a storage element 50 containing the coordinates v, for example, the Cartesian coordinates, of the N pixels making up the high resolution image. They also include a storage element 52 containing the standard deviation r of the covariance matrix Z and a storage element 54 containing the variance $\beta$ of the modeled noise for the imaging process.

The processor 24 also contains storage elements containing current values of optimization parameters. Storage element 56 contains two dimensional shift parameters $s_k$ for each of the K low resolution images being analyzed. Storage element 58 contains rotation parameters $\theta_k$ of the K low resolution images being analyzed. Storage element 60 contains the standard deviation $\gamma$ for the distribution model of the point spread function (PSF). The processor 24 receives a series of inputs from the camera 18 composed of k low resolution images each of which is comprised of M pixels. This input is stored in storage element 62 in FIG. 5A.

FIG. 5A contains a processing block 64 that is responsive to the contents of storage elements 50, 56, 58, 60, and 62 to compute the transform $W^{(k)}$ for each of the K low resolution images. A transform operation 66 takes the contents of storage locations 50, 56, and 58 and produces the u vector described above which is stored in a storage element 68. Storage element 68 stores a u vector composed of M elements for each of the K low resolution images. A vector subtraction operation 70 takes the contents of the storage elements 50 and 68 and produces the difference value used in the numerator in equation (B) above. Operation 72 in FIG. 5A generates a Gaussian distribution based on the contents of the storage elements 50 and 60 by implementing the rest of equation (B) above. The results of the operation 72 are normalized in operation 74 in accordance with equation (A). The result of operation 72 is a transform matrix $W^{(k)}$ for each of the K low resolution images. Each matrix $W^{(k)}$ is an MxN matrix, where M is the number of pixels in the low resolution image being analyzed and N is the number of pixels in the high resolution image corresponding the low resolution image.

Transpose operation 78 is responsive to the contents of storage element 76 to produce the transpose of each of the K matrices in storage element 76. Matrix product operation 80 multiplies the transpose of the $W^{(k)}$ matrices from operation 78 by the low resolution image information from storage element 62. The result of the operation 80 is input to a vector sum operation 82 in FIG. 5B which implements the summation operation specified in equation (2) above. A matrix product operation 84 in block 64 multiplies each matrix $W^{(k)}$ in storage location 76 by its respective transpose resulting from operation 78. A matrix sum operation 86 in FIG. 5B takes the products from operation 84 and sums them to produce the summation in equation (1) above.

A multiplier 88 multiplies the summation produced by operation 86 by the content of storage element 54 to produce one of the bracketed terms in equation (1). The other term is produced as follows. A vector subtract operation 90 in FIG. 5A is responsive to the content of storage element 50 to produce the difference value in the numerator of equation (E). Operation 92 generates a Gaussian distribution based on the contents of storage element 52 and the result of the vector subtract operation 90 by implementing the rest of equation (E). The result is the covariance matrix Z and is stored in storage element 94. The inverse of the covariance matrix is computed in operation 96.

A matrix sum operation 98 in FIG. 5B is responsive to the result of operation 96 in FIG. 5A and the result of operation 88 in FIG. 5B to produce the precision matrix P [which is the inverse of the matrix $\Sigma$ defined by equation (1)]. The matrix P is an NxN matrix and is stored in storage element 100. Determinant operation 102 calculates the determinant of the matrix in storage element 100 and logarithm computation element 104 produces the negative logarithm of the determinant derived in operation 102. The result of operation 104 is the first term on the right side of equation (3).

The other term on the right side of equation (3) is generated as follows. An inverse operation 106 in FIG. 5B produces the inverse of the matrix P stored in storage element 100. This produces the matrix $\Sigma$ which is stored in storage element 108. A matrix multiplier 110 multiplies the content of the storage element 108 and the result of the vector sum operation produced by vector summer 82. The output of the multiplier 110 is multiplied by the content of storage element 54 in multiplier 112 thereby producing the mean of the posterior distribution μ specified in equation (2). The output of the multiplier 112 is stored in storage element 114. The transpose of the matrix μ is produced by operation 116. The inner product of the precision matrix P from storage element 100, the matrix μ from storage element 114, and the transpose of the matrix μ from operation 116 is generated by a multiplier 118. The output of the multiplier 118 is the second term on the right side of equation (3).

The outputs of operation 104 and operation 118 in FIG. 5B are added together by adder 120 to produce the marginal likelihood function $f$ defined by equation (3) which is stored in block 122. As discussed above, an iteration process is undertaken to find the values of the registration parameters that optimize the value of the function $f$ When the registration parameters that optimize $f$ have been found, then the full high resolution image can be derived by the processor 24 using those registration parameters in equations (1) and (2).

DETAILED COMPARATIVE EXAMPLES

Example 1

Visible Imagery

Figure 6A:
FIG. 6A-6C are comparative results in video imaging obtained using the Tipping-Bishop algorithm and the improved procedures of this invention.
Figure 6B:
Figure 6C:
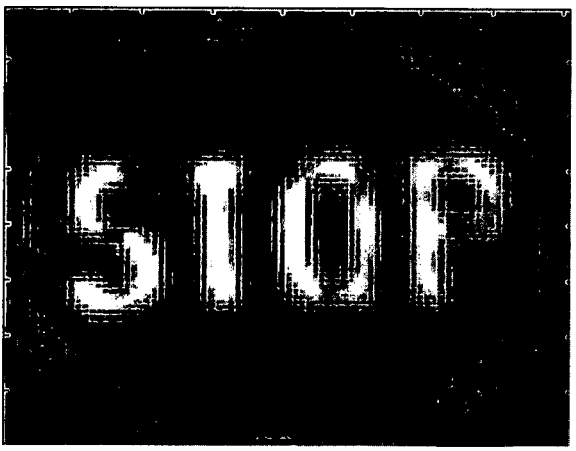

A sample result of super-resolving the image utilizing Tipping and Bishop's algorithm and utilizing this invention is shown in FIGS. 6A, 6B, and 6C. FIG. 6A is the first frame of the original image sequence. FIG. 6B is the result of applying 9× resolution enhancement through the Tipping & Bishop algorithm. FIG. 6C is the result of 9× resolution enhancement with our method where three small regions spread across the image are used to identify the optimal registration and deblurring parameters.

The original images (10 frames) were captured using a handheld digital camera. Each frame was captured so that it underwent a small rotation either as a pan and/or roll of the camera. The resulting image sequence was used as the inputs to the algorithm described in the previous section. In particular, the color images were converted to grayscale and analyzed for information content. In the next step, three regions-of-interest were identified and used as inputs to the optimization step of the algorithm. Once the registration and PSF parameters are identified the entire set of frames are passed to the full-frame enhancement stage to produce the super-resolved image.

Example 2

In-Flight Long Wavelength Infrared (LWIR) Imagery

Figure 7A:
FIG. 7A-7B are sample results for 4× sensor super-resolution of in-flight LWIR imagery.
Figure 7B:

We obtained LWIR imagery from Rockwell Collins recorded during a flight in December 2004. In this platform, a thermal infrared camera was mounted in a dichroic-beam splitter configuration to simultaneously collect registered visible imagery. FIGS. 7A and 7B presents sample results obtained using a 4× resolution enhancement. FIG. 7A is the original 320×240 LWIR image of a runway with clouds on the horizon. FIG. 7B is a 4× resolution enhanced image.

Example 3

Indoor LWIR Imagery

Figure 8A:
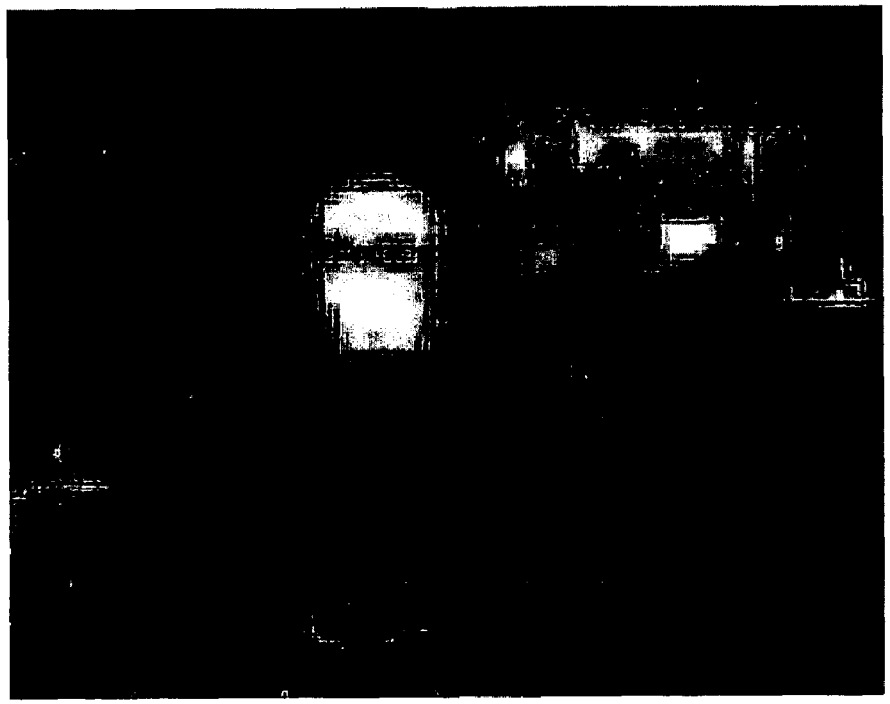
FIGS. 8A-8C are additional LWIR comparative results obtained indoors.
Figure 8B:
Figure 8C:
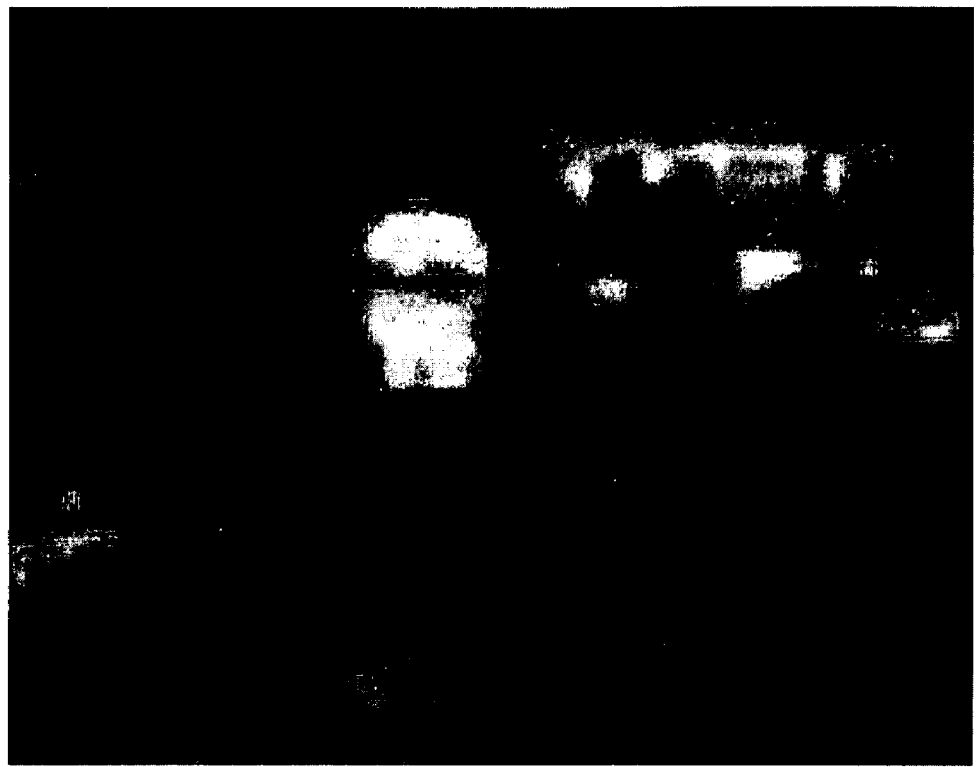

To supplement the data made available to us by Rockwell Collins in Example 2, we collected indoor imagery utilizing our own FLIR Systems A20 camera. This camera is capable of imaging long-wave infrared at 320×240 resolution. FIG. 8A is an original 320×240 image. FIG. 8B shows the results of applying the techniques of this invention to 9 low-res frames (no size increase, N=M). This result demonstrates the effectiveness of the multi-frame fusion in improving overall contrast and reducing noise (i.e. information enhancement). FIG. 8C demonstrates 4× resolution enhancement. Note the significant enhancement of information and substantial reduction of aliasing across the image.

The example shown in FIGS. 8A, 8B, and 8C presents further evidence of the effectiveness of the Bayesian approach of this invention in obtaining up to 9× sensor resolution. In the first comparison, we present the first frame of the original sequence in FIG. 8A together with the results in FIG. 8B of fusing all 9 available frames using the Bayesian approach (no resolution enhancement was applied). These results highlight the effectiveness of the registration and deblurring artifacts.

The second comparison shown in FIG. 8C showcases an effective 4× (i.e. N=4*M) resolution enhancement of the original 320×240 imagery.

REFERENCES

[1] B. D. Lucas and T. Kanade. An Iterative Image Registration Technique with an Application to Stereo Vision (DARPA) Proceedings of the 1981 DARPA Image Understanding Workshop, April, 1981, pp. 121-130.

[2] B.D. Lucas and T. Kanade An Iterative Image Registration Technique with an Application to Stereo Vision (IJCAI) Proceedings of the 7th International Joint Conference on Artificial Intelligence (IJCAI '81), April, 1981, pp. 674-679.

[3] S. Baker and I. Matthews, Lucas-Kanade 20 Years On: A Unifying Framework: Part 1, tech. report CMU-RI-TR-02-16, Robotics Institute, Carnegie Mellon University, July, 2002.

[4] S. Baker, R. Gross, I. Matthews, and T. Ishikawa, Lucas-Kanade 20 Years On: A Unifying Framework: Part 2, tech. report CMU-RI-TR-03-01, Robotics Institute, Carnegie Mellon University, February, 2003.

[5] S. Baker, R. Gross, and I. Matthews, Lucas-Kanade 20 Years On: A Unifying Framework: Part 3, tech. report CMU-RI-TR-03-35, Robotics Institute, Carnegie Mellon University, November, 2003.

[6] Michael E. Tipping, Christopher M. Bishop: Bayesian Image Super-Resolution. NIPS 2002: 1279-1286.

APPENDIX 1

Table of Variables

| | |
|---|---|
| $v_i$ | Coordinate frame of reference for the high-resolution signal or image and registration for low-resolution signals or images |
| $v_j$ | Coordinate frame of reference for the low-resolution signal or image and registration for low-resolution signals or images |
| u | Coordinate, transformed frame of reference for low-resolution image(s) |
| $\bar{v}$ | Mid-point of the signal (in one embodiment, this could be the center of the image) |
| y | Low-resolution set of signals or images |
| M | Dimensionality of the low-resolution signal (in one embodiment, this could be the number of pixels (width × height) in the low-resolution images) |
| N | Dimensionality of the high-resolution signal (in one embodiment, this could be the number of pixels (width × height) in a high-resolution image) |

APPENDIX 1-continued

Table of Variables

| | |
|---|---|
| j | Index for referencing the M entries in the low-resolution data |
| i | Index for referencing the N entries in the high-resolution data |
| $i_1$ | Index for reference entry in the high-resolution data |
| $i_2$ | Index for entry (e.g. pixel) to be analyzed for covariance in the high-resolution data |
| β | Variance of the modeled noise for the signal collection or imaging process |
| K | Number of low-resolution signals or images |
| k | Index for low-resolution signals or images |
| $s^{(k)}$ | Shift (translation) required to register signal or image k to the global frame of reference |
| $\theta^{(k)}$ | Rotation required to register signal or image k to the global frame of reference |
| γ | Standard deviation for distribution model of Point-Spread-Function (PSF) |
| A | Generic variable that captures any number of transformation parameters for example, degree of pin-cushion distortion, degree of barrel distortion, shift, rotation, degree of blurring kernels including Gaussian or other diffraction kernels. |
| Z | Covariance matrix defining the prior of the high-resolution signal or image |
| r | Standard deviation of Z |
| $W^{(k)}$ | Model for the mapping of the high-resolution signal or image onto the low-resolution signal or image k |
| μ | Mean of the posterior distribution modeled for the high-resolution signal or image (this is the estimate for the high-resolution signal or image once the parameters have been optimized) |
| Σ | Variance attributed to the noise in the inferred high-resolution signal or image |
| P | Precision of the posterior distribution |
| G | A Gaussian distribution operator (generates an appropriate distribution based on the input parameters). |
| T | The Transpose-of-a-Matrix operator |
| f | The marginal likelihood measurement |

APPENDIX 2

Derivation of Marginal Likelihood

The marginal likelihood can be derived from the joint on x (the hi-res image) and y (the low-res images) as follows (to simplify the exposition, all of the images $y^{(1)}, \ldots, y^{(k)}$ are represented using a single signal y that is the concatenation of the component images:

First, define the probability on x and the probability of y given x:

$$P\{x\} = N\{x; 0; Z\} = (2\pi)^{-n/2}|Z|^{-1/2}\exp\left[-\frac{1}{2}x^T Z^{-1} x\right]$$

$$P\{y \mid x\} = (2\pi)^{-m/2}|\Sigma_2|^{-1/2}\exp\left[-\frac{1}{2}(y - Wx)^T \Sigma_2^{-1}(y - Wx)\right]$$

where:

$$\Sigma_2 \equiv \beta^{-1}\begin{bmatrix} 1 & & 0 \\ & \ddots & \\ 0 & & 1 \end{bmatrix}$$

Now, the joint probability can be defined as the product of the two probabilities defined above:

$$P\{x, y\} =$$

$$(2\pi)^{-m/2}|\Sigma_2|^{-1/2}(2\pi)^{-n/2}|Z|^{-1/2}\exp\left[-\frac{1}{2}(y - Wx)^T \Sigma_2^{-1}(y - Wx) - \frac{1}{2}x^T Z^{-1} x\right]$$

A number of simplifications can be performed:

$$P\{x, y\} = (2\pi)^{-(n+m)/2}\beta^{m/2}|Z|^{-1/2}\exp\left[-\frac{1}{2}\beta(y - Wx)^T(y - Wx) - \frac{1}{2}x^T Z^{-1} x\right]$$

$$P\{x, y\} =$$

$$(2\pi)^{-(n+m)/2}\beta^{m/2}|Z|^{-1/2}\exp\left[-\frac{1}{2}(x^T(Z^{-1} + \beta W^T W)x - 2\beta y^T Wx + \beta y^T y)\right]$$

Notice that $\Sigma^{-1} \equiv Z^{-1} + \beta W^T W$

Thus, by completing the square:

$$2\mu^T \Sigma^{-1} x = 2\beta y^T W x$$

$$\Sigma^{-1}\mu = \beta W^T y$$

$$\mu = \beta \Sigma W^T y$$

We can substitute into our joint:

$$P\{x, y\} =$$

$$(2\pi)^{-(n+m)/2}\beta^{m/2}|Z|^{-1/2}\exp\left[-\frac{1}{2}\begin{pmatrix} x^T\Sigma^{-1}x - 2\mu^T\Sigma^{-1}x + \mu^T\Sigma^{-1}\mu + \\ 2\mu^T\Sigma^{-1}x - \mu^T\Sigma^{-1}\mu - 2\beta y^T Wx + \beta y^T y \end{pmatrix}\right]$$

Then simplifying and collecting terms:

$$P\{x, y\} = (2\pi)^{-(n+m)/2}\beta^{m/2}|Z|^{-1/2}\exp\left[-\frac{1}{2}\begin{pmatrix} (x - \mu)^T\Sigma^{-1}(x - \mu) + \\ 2(\beta\Sigma W^T y)^T\Sigma^{-1}x - \mu^T\Sigma^{-1}\mu - \\ 2\beta y^T Wx + \beta y^T y \end{pmatrix}\right]$$

$$P\{x, y\} = (2\pi)^{-(n+m)/2}\beta^{m/2}|Z|^{-1/2}\exp\left[-\frac{1}{2}\begin{pmatrix} (x - \mu)^T\Sigma^{-1}(x - \mu) + \\ 2\beta y^T W\Sigma\Sigma^{-1}x - \mu^T\Sigma^{-1}\mu - \\ 2\beta y^T Wx + \beta y^T y \end{pmatrix}\right]$$

$$P\{x, y\} = (2\pi)^{-(n+m)/2}\beta^{m/2}|Z|^{-1/2}$$

$$\exp\left[-\frac{1}{2}((x - \mu)^T\Sigma^{-1}(x - \mu) + 2\beta y^T Wx - \mu^T\Sigma^{-1}\mu - 2\beta y^T Wx + \beta y^T y)\right]$$

$$P\{x, y\} = (2\pi)^{-(n+m)/2}\beta^{m/2}|Z|^{-1/2}$$

$$\exp\left[-\frac{1}{2}((x - \mu)^T\Sigma^{-1}(x - \mu) - \mu^T\Sigma^{-1}\mu + \beta y^T y)\right]$$

Now, we apply the marginalization of x (i.e. sum over the terms dependent on x):

$$P\{y\} = (2\pi)^{-(n+m)/2}\beta^{m/2}|Z|^{-1/2}$$

$$\exp\left[-\frac{1}{2}(-\mu^T\Sigma^{-1}\mu + \beta y^T y)\right]\left(\int \exp\left[-\frac{1}{2}(x - \mu)^T\Sigma^{-1}(x - \mu)\right]dx\right)$$

$$P\{y\} = (2\pi)^{-(n+m)/2}\beta^{m/2}|Z|^{-1/2}\exp\left[-\frac{1}{2}(-\mu^T\Sigma^{-1}\mu + \beta y^T y)\right](|\Sigma|^{1/2}(2\pi)^{n/2})$$

$$P\{y\} = (2\pi)^{-m/2}\beta^{m/2}|Z|^{-1/2}|\Sigma|^{1/2}\exp\left[-\frac{1}{2}(-\mu^T\Sigma^{-1}\mu + \beta y^T y)\right]$$

This provides the simplified definition of the probability on y. Now, we obtain the marginal likelihood function by taking the log on both sides:

$$\lg P\{y\} = -\frac{1}{2}(m\lg(2\pi) + m\lg\beta + \lg|Z| - \lg|\Sigma| - \mu^T\Sigma^{-1}\mu + \beta y^T y)$$

Allowing for K low resolution images, we obtain marginal likelihood function for our problem:

$$\lg P\{y\} = -\frac{1}{2}\begin{pmatrix} KM\lg(2\pi) + KM\lg\beta + \lg|Z| - \\ \lg|\Sigma| - \mu^T\Sigma^{-1}\mu + \beta y^T y \end{pmatrix}$$

Because the marginal likelihood will be used as the optimization function, we can eliminate from it any terms that will remain constant as a function of the alignment parameters ($S_k$, $\theta_k$, y) that we seek to optimize. In particular the first, second, third, and sixth terms in the above equation are constant under changes to these parameters are thus eliminated from our target equation:

$$f(y) = -\frac{1}{2}(-\lg|\Sigma| - \mu^T\Sigma^{-1}\mu)$$

Since precision is the inverse ot distribution ($P=\Sigma^{-1}$), we can avoid performing the computation of the inverse by substituting P:

$$f(y) = -\frac{1}{2}(\lg|P| - \mu^T P\mu) \propto -\lg|P| + \mu^T P\mu \equiv -g(y)$$

the result is a function that can readily be optimized by performing a minimization technique on the parameters of interest:

$$\langle s, \theta, \gamma \rangle = \underset{s,\theta,\gamma}{\mathrm{argmax}}(-\lg|P| + \mu^T P\mu)$$

The Title, Technical Field, Background, Summary, Brief Description of the Drawings, Detailed Description, References, Appendices, and Abstract are meant to illustrate the preferred embodiments of the invention and are not in any way intended to limit the scope of the invention. The scope of the invention is solely defined and limited by the claims set forth below.

The invention claimed is:

1. A computer implemented method of deriving a high resolution image from a plurality of low resolution images, comprising the steps of:

initializing one of more alignment parameters to one or more likely values;

determining the marginal likelihood of the low resolution images using the one or more alignment parameters, in which the marginal likelihood is a function $f$ of the alignment parameters where:

$f = -\lg|P| + \mu^T P\mu$, and P is the precision of the posterior distribution and $\mu$ is the mean of the distribution modeled for the high resolution image;

adjusting the alignment parameters so as to optimize the marginal likelihood determination; and determining the high resolution image using the adjusted alignment parameters.

\* \* \* \* \*